United States Patent
Dey et al.

(10) Patent No.: US 10,320,704 B2
(45) Date of Patent: Jun. 11, 2019

(54) USER DRIVEN SMARTPHONE SCHEDULING ENHANCEMENT FOR RUNNING DATA ANALYTICS APPLICATION

(71) Applicant: TATA CONSULTANCY SERVICES LIMITED, Mumbai (IN)

(72) Inventors: Swarnava Dey, Kolkata (IN); Arijit Mukherjee, Kolkata (IN); Pubali Datta, Kolkata (IN); Himadri Sekhar Paul, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 384 days.

(21) Appl. No.: 14/665,979

(22) Filed: Mar. 23, 2015

(65) Prior Publication Data

US 2016/0119248 A1    Apr. 28, 2016

(30) Foreign Application Priority Data

Oct. 22, 2014 (IN) .......................... 3370/MUM/2014

(51) Int. Cl.
| | |
|---|---|
| *H04L 12/923* | (2013.01) |
| *H04L 12/927* | (2013.01) |
| *H04L 12/911* | (2013.01) |
| *H04L 12/26* | (2006.01) |
| *G06F 9/48* | (2006.01) |
| *G06F 9/50* | (2006.01) |

(52) U.S. Cl.
CPC ............ *H04L 47/762* (2013.01); *G06F 9/485* (2013.01); *G06F 9/4843* (2013.01); *G06F 9/5022* (2013.01); *H04L 43/14* (2013.01); *H04L 47/803* (2013.01); *H04L 47/821* (2013.01)

(58) Field of Classification Search
CPC ..... H04L 47/762; H04L 43/14; H04L 47/803; H04L 47/821
USPC ......................................................... 709/226
See application file for complete search history.

(56) References Cited

U.S. PATENT DOCUMENTS

| | | | |
|---|---|---|---|
| 9,411,637 B2 * | 8/2016 | Ramesh ................ G06F 9/4831 |
| 9,779,183 B2 * | 10/2017 | Gallo ................ G06F 17/30997 |
| 2012/0174106 A1 * | 7/2012 | Seo ......................... G06F 9/485 718/100 |
| 2012/0324481 A1 * | 12/2012 | Xia ......................... G06F 9/485 719/320 |
| 2013/0159377 A1 | 6/2013 | Nash | |
| 2014/0141768 A1 | 5/2014 | Javaid et al. | |
| 2014/0282820 A1 * | 9/2014 | Walton .................. G06F 21/604 726/1 |
| 2014/0317734 A1 * | 10/2014 | Valencia ............... G06F 21/552 726/22 |
| 2015/0193904 A1 * | 7/2015 | Vermeulen ................ G06T 1/20 345/522 |

\* cited by examiner

*Primary Examiner* — Kevin T Bates
*Assistant Examiner* — Nazia Naoreen
(74) *Attorney, Agent, or Firm* — Seed IP Law Group LLP

(57) ABSTRACT

Methods and devices for controlling execution of a data analytics application on a computing device are described. The devices include an alert app to prompt a user on system load and to recommend the user for proactively controlling the execution of a set of processes to reclaim computational resources required for execution of the data analytics application on the devices.

11 Claims, 10 Drawing Sheets

USER DRIVEN SMARTPHONE SCHEDULING ENHANCEMENT FOR RUNNING DATA ANALYTICS APPLICATION

TECHNICAL FIELD

The present subject matter relates to computing devices and, particularly but not exclusively, to methods and systems for controlling execution of data analytics application on the computing devices.

BACKGROUND

Computer technology, in both hardware and software, enables the use of small computing devices, such as Smartphones, mobile phones, personal digital assistants, and electronic tablets, to execute programs and applications that previously require desktop computers or laptop computers. The small computing devices are very popular but are subject to certain constraints, such as relatively small size of memory and limited processing capabilities. Due to the limited size of the memory and limited processing capabilities, processors of the small computing devices execute multiple applications at varying levels of priority, with instructions of higher priority applications being preferentially executed over instructions of lower priority applications. However, due to such prioritization, users of the small computing devices remain unaware about the allocation of prospective computational resources to low priority applications some of which may be important to the users.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
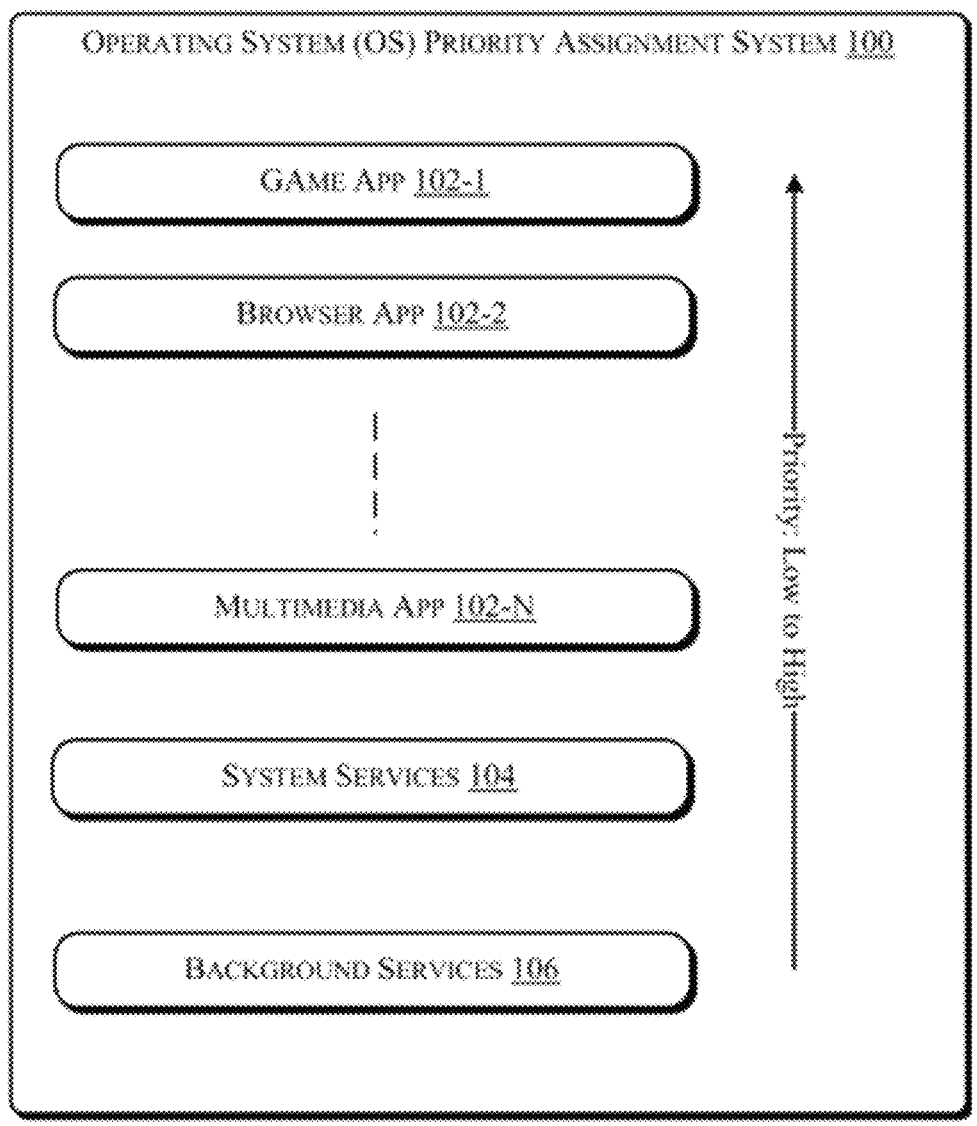
FIG. 1 illustrates an exemplary conventional operating system (OS) priority assignment system.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DESCRIPTION OF EMBODIMENTS

The present subject matter relates to methods and systems for controlling execution of data analytics applications on a computing device. The methods and the systems of the present subject matter can be implemented on various computing devices. Further, in the description hereinafter of the present subject matter and without any limitation, the term 'computing device' may be understood to refer to a smartphone, a mobile phone, a hand-held device, a tablet, a netbook, a laptop, a personal digital assistant (PDA), a notebook, and other portable computing device. Yet further, in view of the description of term 'computing device, the term computing device and smartphone are used interchangeably in the description hereinafter.

Generally, a computing device is capable of executing multiple applications at once. The multiple applications include foreground applications executed, implicitly and explicitly, by a user accessing the computing device and background applications executed by an operating system of the computing device. Further, the foreground applications enable the user to interact with the computing device in many different ways, and perform various functions, for example, accessing and displaying websites, sending and receiving e-mails, playing game, displaying photographs, playing videos, and other functions. On the other hand, the background applications may run in a background state, may not be visible to the user, and do not solicit user input.

Further, in multi-tasking processes, the multiple applications may be executed and processed on the computing device without terminating an already executing application, and there is a need to switch among the multiple applications being executed. The switching among the multiple applications may be performed by switching between the foreground applications and the background applications. In general and as can be appreciated by those skilled in the art, the foreground applications being preferentially executed over the background applications. That is, the foreground applications may be understood as high priority applications executed first after ceasing the execution of the background applications having a lower priority.

Yet further, in recent times, many data analytics applications are being developed as applications that leverage a diverse range of sensors embodied in the computing device. The data analytics applications often run as background applications, and usually obtain and process data from the sensors of the computing device. In an example, and not by way of limitation, the data analytics applications cover several domains, such as healthcare, transportation, etc., that are related to the Internet of Things (IoT) paradigm. Some of the data analytics applications solve real time and mission critical problems including fire-fighting, heart rate monitoring, and the like.

However, as stated hereinabove, the computing device is typically optimized for prioritizing the foreground applications, as the performance of the computing device is gauged based on the responsiveness of the foreground applications. Since the foreground applications are prioritized over the background applications, the user of the computing device may remain unaware about resource-starved background applications some of which may be important to the user.

Accordingly, it is desirable to provide a mechanism for the user to work around prioritization of the high priority foreground applications with more flexibility than conventional mechanisms.

Various embodiments and implementations of the present subject matter describe methods and systems for controlling execution of data analytics application on a computing device. In an implementation, the data analytics application is a background application designated by a user as a user preferred application. The user preferred application is generally put by a scheduler of an operating system in highest priority position for execution on the computing device.

In operation, the methods and systems of the present subject matter includes controlling execution of the data analytics application. The steps for controlling execution of the data analytics application include analyzing a usage pattern of the computational resources by one or more applications executing on the computing device. In an example, and not by way of limitation, the one more applications can include top computational resource consuming applications including foreground applications and background applications. Further, once the analyzing is performed, a prospective utilization of the computational resources by one or more foreground applications is estimated based on historical data and the analysis. The historical data may be considered as data indicating a user-specific usage pattern of the computational resources of the computing device with respect to time of day, day of week, month, year etc., and other context parameters like user's location, network cell, mobility and network usage. In said example, it is assumed that the computing device is used by one particular user and a specific usage pattern exists that reveals a relative system load in terms of the computational resources usage in the computing device.

The estimation of the prospective utilization of the computational resources is followed by determining whether the prospective utilization would result in starvation of the computational resources required for executing the data analytics application on the computing device. Based on the determining, the computing device prompts the user to proactively control the execution of the one or more foreground applications for successful execution of the data analytics application. In an example, the user proactively control the execution of the one or more foreground applications by removing, pausing, or preempting execution of at least one of the one or more foreground applications to reclaim the computational resources for successful execution of the data analytics application.

In this way, the present subject matter facilitates the methods and the systems with a mechanism that allows the user to work around prioritization of the high priority foreground applications with more flexibility than conventional mechanisms. Further, the mechanism proposed by the methods and systems of the present subject matter serves as a wrapper on currently available operating systems, such as Android® and iPhone™ Operating System (iOS), to implement a different optimization policy that favors the interactive foreground applications, but can accommodate the requisite of the user preferred background application when specified by the user.

The methods and the systems of the present subject matter are also applicable when the user has one preferred application among several running foreground applications and needs to ensure that the preferred one gets access to computational resources when needed. Further, the methods and the systems of the present subject matter can be implemented on existing computing devices or smartphones, positioned as edge computing devices, where addition of edge computing software may hamper standard user experience, users already enjoy.

Further, the description hereinafter of the present subject matter includes various specific details to assist in understanding various aspects but these are to be regarded as merely exemplary. Accordingly, those of ordinary skill in the art will recognize that various changes and modifications of the embodiments described herein can be made without departing from the scope and spirit of the present subject matter. In addition, descriptions of well-known functions and constructions may be omitted for clarity and conciseness.

The terms and words used in the following description are not limited to the bibliographical meanings, but, are merely used to enable a clear and consistent understanding of the present subject matter. Accordingly, it should be apparent to those skilled in the art that the following description of exemplary embodiments or implementations of the present subject matter is provided for illustration purpose only and not for the purpose of limiting the invention.

It should be noted that the description merely illustrates the principles of the present subject matter. It will thus be appreciated that various arrangements may also be employed that, although not explicitly described herein, embody the principles of the present subject matter and are included within its spirit and scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof. The manner in which the methods shall be implemented onto various systems has been explained in detail with respect to the FIGS. 1-10. While aspects of described systems and methods can be implemented in any number of different computing devices and/or configurations, the embodiments are described in the context of the following system(s).

FIG. 1 illustrates a conventional operating system (OS) priority assignment system 100 for a conventional computing device. As can be convened from FIG. 1, the conventional OS priority assignment system 100 assigns highest priority to applications that are interactive to a user of the conventional computing device. That is, the foreground applications 102-1, 102-2 . . . , 102-N, hereinafter collectively referred to as foreground applications 102, are provided with highest priority in the conventional OS priority assignment system 100. As an example, in FIG. 1, it can be seen that the foreground applications 102, including a game app 102-1, a browser app 102-2, and a multimedia app 102-N, are prioritized higher for execution over applications corresponding to the system services 104 and background services 106.

Further, as can be appreciated by those skilled in the art, the conventional computing device is typically optimized for prioritizing the foreground applications over other applications or services, as the performance of the computing device is gauged based on the responsiveness of the foreground applications. The responsiveness of the foreground applications is measured based on a response latency of accessing a user interface of the conventional computing device. The response latency of the user interface in the conventional computing device is improved or maintained by assigning the execution priorities, by the conventional OS priority assignment system 100, in deceasing order in a hierarchy of foreground applications, visible applications, background applications, etc. By having such execution priorities, whenever a new process or new application having higher priority is, implicitly or explicitly, executed by the user, the new application may necessitate removal of old and less important processes and applications executing on the conventional computing device for reclaiming computational resources, such as memory and processor(s), for successful execution on the conventional computing device. The manner in which the execution priorities are implemented in the conventional computing device is further described in conjunction with FIG. 2

Figure 2:
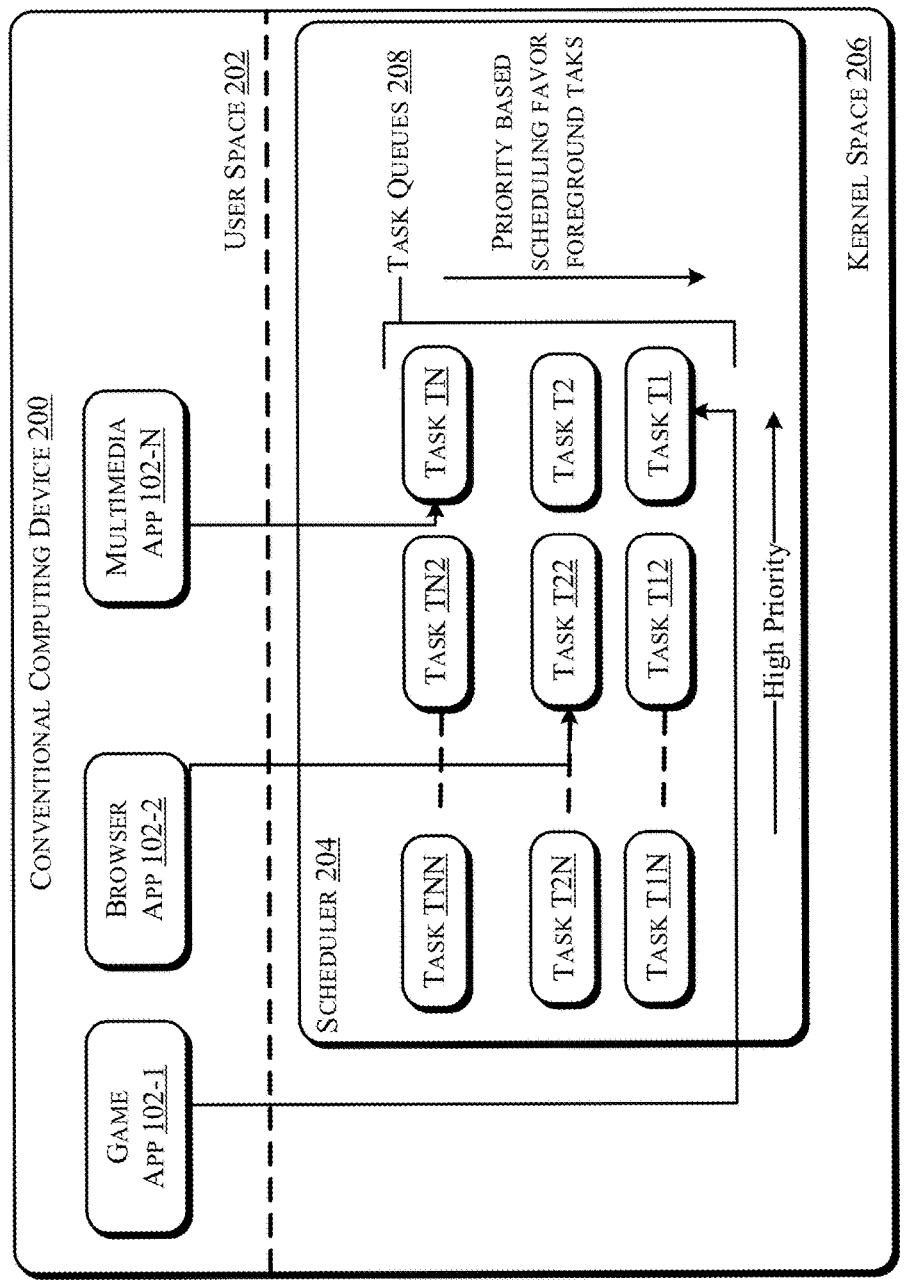
FIG. 2 illustrates an exemplary conventional computing device 200 implementing the conventional OS priority assignment system.

FIG. 2 illustrates a conventional computing device 200 implementing the conventional OS priority assignment system 100. The conventional OS priority assignment system 100 is implemented by putting the applications, including the foreground applications 102, as a part of a user space 202, and a task scheduler or, simply, a scheduler 204 as a part of an operating system (OS) core or a kernel space 206. The user space 202 is a restricted low privilege user space in which the foreground applications 102 run and do not have direct access to hardware units of the conventional computing device 200. The foreground applications (apps) 102 contain a pointer to a set of task queues 208, arranged according to the assigned execution priorities, implemented inside the scheduler 204. That is, a task T1 pointed by a foreground application, say a game app 102-1, having highest execution priority is put in a highest priority task queue for execution.

However, in recent times, many human-centric applications (apps) are being developed to leverage diverse range of sensors present in conventional computing device 200, say a smartphone. In several domains such as healthcare, transportation, etc., smartphone is being used as EDGE network gateway for fusing data from sensors. These human-centric applications often run as background services and usually obtain and process sensor data. This is a completely new requirement as previous or conventional smartphone was not used for periodic data crunching jobs.

Figure 3B:
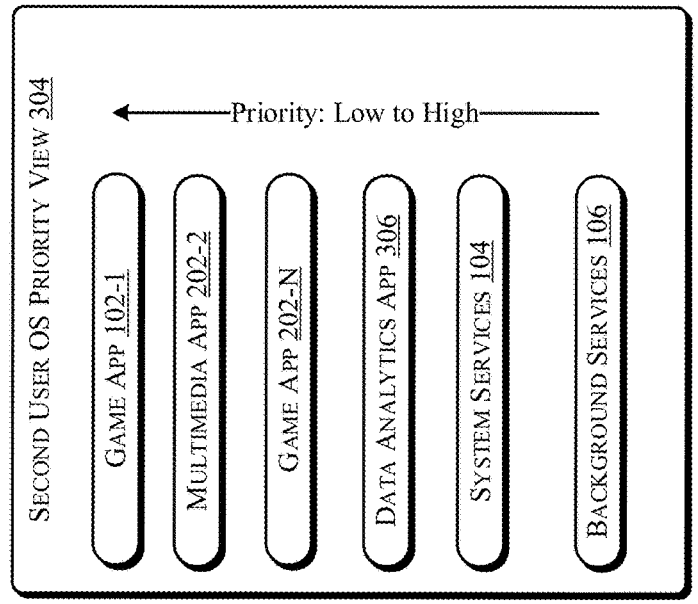
FIGS. 3A and 3B illustrate an exemplary difference in user's notion of prioritizing applications running on the conventional computing device during different time periods.
Figure 3A:
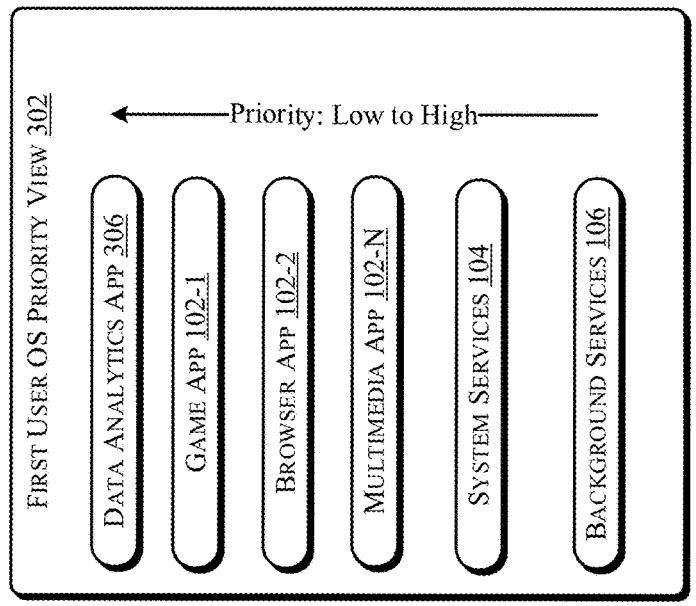

Further, since the human-centric applications run as a background service, the human-centric applications may not get highest priority on the conventional computing device through out the day. For example, at different time periods of a day, a user may have different ideas about a relative importance of the applications running on the conventional computing device 200 or the smartphone. FIG. 3A and FIG. 3B illustrate an exemplary difference in user's notion of prioritizing the applications running on the conventional computing device 200 during the different time periods of the day. For example, FIG. 3A illustrates a first user operating system (OS) priority view 302, and FIG. 3B illustrates a second user operating view 304. In FIG. 3A, at a time period, a data analytics app (application) 306 is prioritized over other foregrounds applications 102, including, the game app 102-1, a browser app 102-2, a multimedia app 102-N, the system services 104, and the background services 106. That is, at the time period of first user OS priority view 302, since the user has prioritized the data analytics app 306, the data analytics app 306 runs in the background periodically, processes data that arrive periodically, within a deadline, and send the processed data over a network.

However, as can be seen from FIG. 3B, at another time period of the day, the user prioritize to play game through the game app 102-1 over the other applications and services, including the data analytics app 306. At this time period, the user may go on playing the game and the data analytics data app 306 would miss periodic deadlines. In such situation and at such time period, there is no existing mechanism that provides the user any notification about an application not getting required computational resources, memory or processing capabilities, of the conventional computing devices 200 for successful execution.

Accordingly, it is desirable to have a mechanism for the user to work around prioritization of the high priority foreground applications with more flexibility than conventional mechanisms to facilitate the successful execution of the data analytics app 302 running in the user space 202 as background services.

The present subject matter provides a mechanism that takes care of the cases where the has data analytics app 302 and several foreground applications 102 having the same priority assigned by the conventional operating system (OS) priority assignment system 100.

Figure 4:
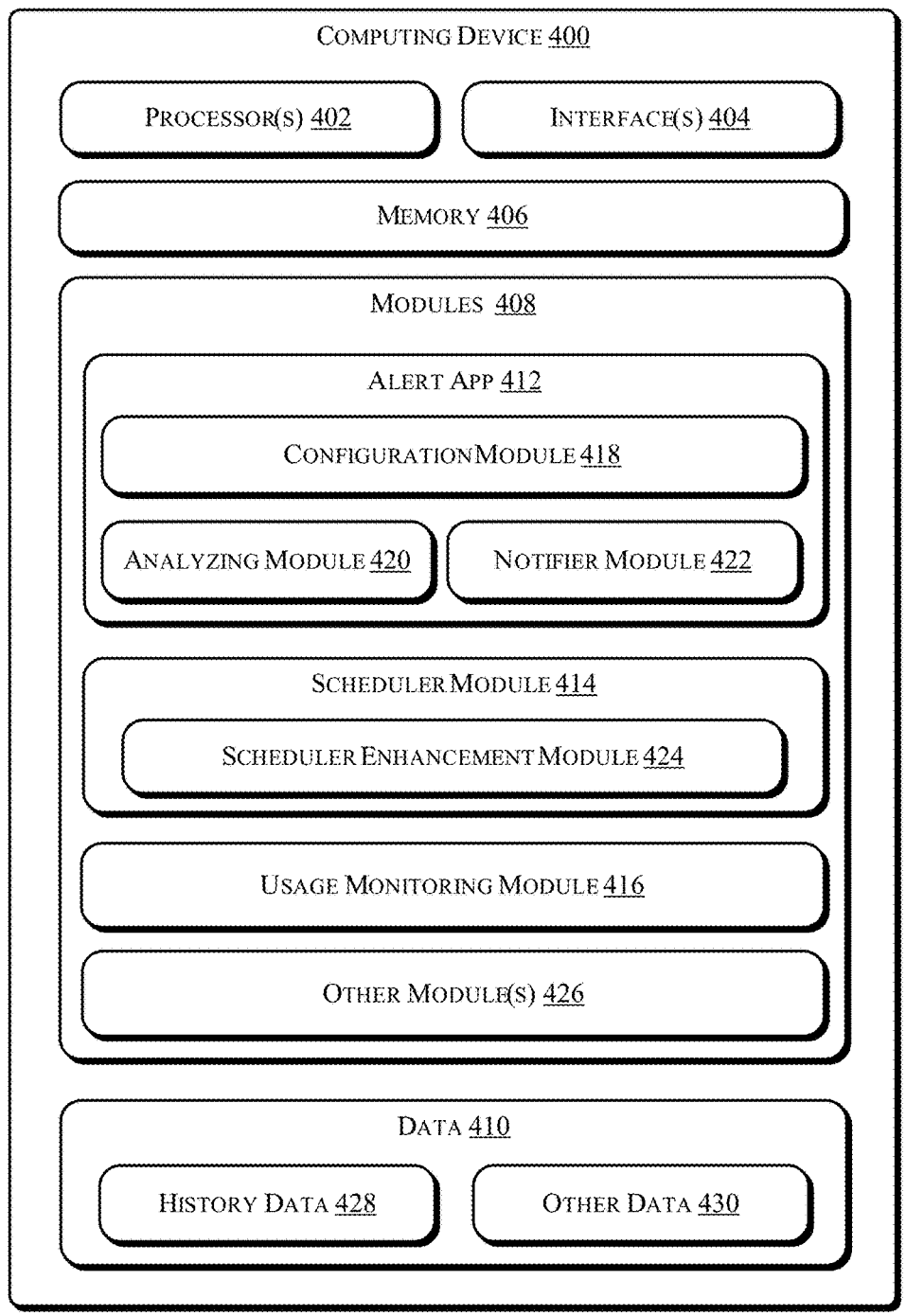
FIG. 4 illustrates an exemplary computing device, according to an embodiment of the present subject matter.
Figure 6:
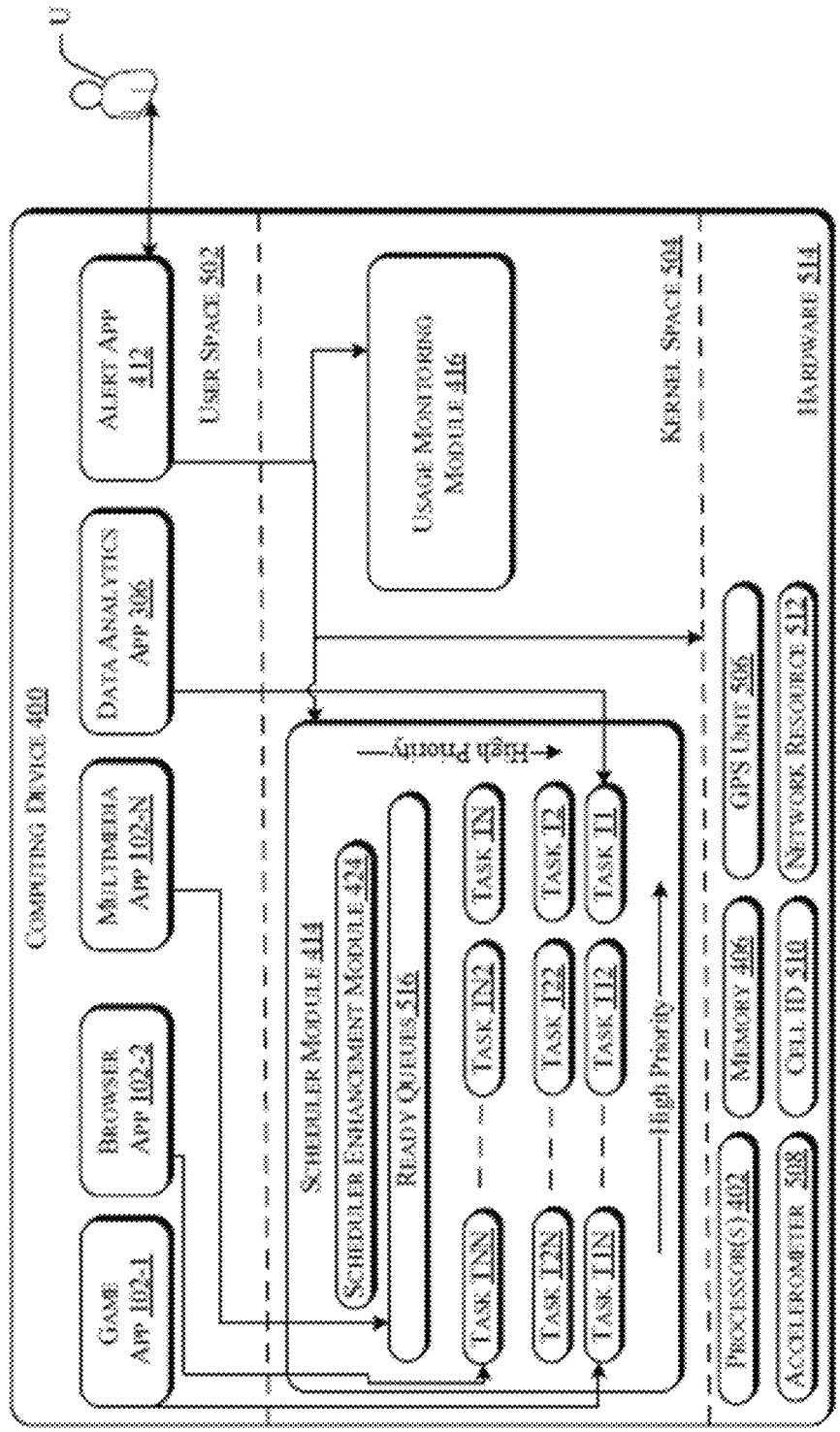
FIG. 6 illustrates an exemplary implementation of an alert application on the computing device, according to another embodiment of the present subject matter.

In accordance with the present subject matter, exemplary components of a computing device 400, according to an exemplary embodiment of the present subject matter, are illustrated in FIGS. 4 and 6. In said embodiment, the computing device 400 includes a processor(s) 402, an interface(s) 404, and a memory 406. The processor(s) 402 may be implemented as one or more microprocessors, microcomputers, microcontrollers, digital signal processors, central processing units, state machines, logic circuitries, and/or any devices that manipulate signals based on operational instructions. Among other capabilities, the processor(s) 402 is configured to fetch and execute computer-readable instructions stored in the memory 406.

The interface(s) 404 may include a variety of computer-readable instructions and hardware interfaces, for example, a web interface, a graphical user interface, etc., allowing the computing device 400 to communicate with other computing devices, such as web servers and external data servers (not shown in figure). The interface(s) 404 can facilitate multiple communications within a wide variety of telecommunication networks and protocol types, including wired networks, for example, LAN, cable, etc., and wireless networks, such as WLAN, cellular, or satellite. The interface(s) 404 may include one or more ports for connecting a number of the computing devices to each other.

The memory 406 can include any computer-readable medium known in the art including, for example, volatile memory (e.g., RAM), and/or non-volatile memory (e.g., EPROM, flash memory, etc.). In one embodiment, the computing device 104 includes module(s) 408 and data 410.

The module(s) 408 usually includes routines, programs, objects, components, data structure, etc., that perform particular task or implement particular abstract data types. In one implementation, the module(s) 408 includes an alert app 412, a scheduler module 414, and usage monitoring module 416. The alert app 412 includes other modules, for example, a configuration module 418, an analyzing module 420, and a notifier module 422. Similarly, the scheduler module 414 includes a scheduler enhancement module 424. In addition to these, the module(s) 408 may include other module(s) 426 to perform various functions of the computing system 104. It will be appreciated that such modules may be represented as a single module or a combination of different modules.

Additionally, the computing device 400 further includes the data 410 that serves, amongst other things, as a repository for storing data fetched, processed, received and generated by one or more of the modules 408. In one implementation, the data 410 may include, for example, history data 428 and other data 430. In an example, the data 410 may be stored in the memory 406 in the form of data structures. Additionally, the aforementioned data 410 can be organized using data models, such as relational or hierarchical data models.

The computing device 400 having the configurations according to the embodiment illustrated in FIG. 4 can be implemented to control the execution of the data analytics app 306 using the conventional OS priority assignment system 100. The working or operation of the computing device 404, illustrated in FIG. 4, is described in detail with reference to FIG. 5 in the description hereinafter.

As describer earlier, in an example, the performance of the computing device 400 is measured based on the performance of the foregrounds applications 102, such as the game app 102-1, the browser app 102-2, and the multimedia app 102-N, running in the user space 502 of the computing device 404. However, in recent times, many data analytics applications are being developed as applications that leverage a diverse range of sensors embodied in the computing device 400. Such data analytics applications execute in the user space 502 of the computing device 400 and run as a background service. For example, in the implementation represented in FIG. 5, the data analytics app 306 executes in the user space 502 along with the other foreground applications 102, including the game app 102-1, the browser app 102-2, and the multimedia app 102-N. In addition to these applications, the computing device 400 embodied or implemented in accordance with the present subject matter facilitates the user space 502 with the alert app 412. In an example, the alert app 412 is configured to alert a user U when the data analytics app 306 may get starved of the computational resources for being executed at a periodic schedule.

In an implementation, the user U interacts with the alert app 412. Upon interaction, the configuration module 418 of the alert app 412 receives the user's input and registers the choice of the user U about the user's view of priority among the applications running on the computing device 400. In an example, the user may register choice by designating the data analytics app 306 as a user preferred application. Based on the user's choice, the configuration module 418 designates the data analytics app 306 as the user preferred application, and communicates the scheduler module 414, running in the kernel space 504, to put the user preferred application in highest priority position task T1 for execution on the computing device 400. In this way, the prioritizing of the user preferred application (the data analytics app 306) is achieved without changing the operating system (OS) firmware.

Figure 5:
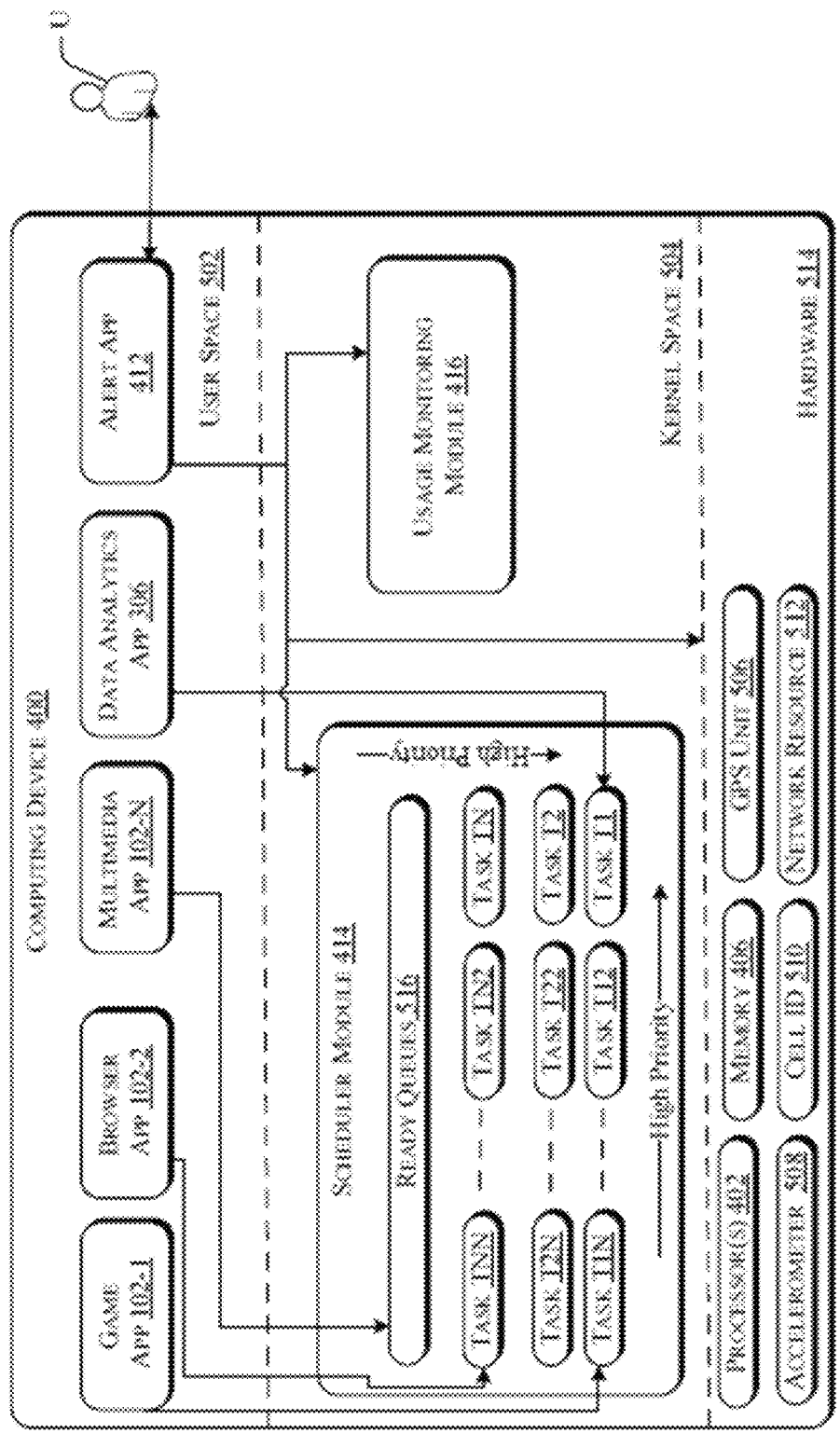
FIG. 5 illustrates an exemplary implementation of an alert application on the computing device, according to an embodiment of the present subject matter.

Further, once the data analytics app 306 is prioritized by the scheduler module 414, the alert app 412 communicates with the usage monitoring module 416 running in the kernel mode 504 to retrieve the historical data 428. The usage monitoring module 416 determines and stores the historical data 428 of usage pattern of the computational resources at regular time intervals. In an example, the historical data 428 is data indicating a user-specific usage pattern of the computational resources of the computing device 400 with respect to time of day, day of week, month, year etc., and other context parameters like user's location, network cell, mobility and network usage. The usage monitor module 416 takes help of operating system (OS) services exposed in the kernel space 540 for determining and storing the historical data 428 of the usage pattern of the computational resources. In said example and not by way of limitation, it is assumed that the computing device 400 is used by one particular user and a specific usage pattern exists that reveals a relative system load in terms of the computational resources usage in the computing device 400. Yet further, as shown in FIG. 5, the computational resources may include, but not limited to, the processor(s) 402, the memory 406, a global position system (GPS) unit 506, an accelerometer 508, cell ID 510, network resource 512, in hardware 514 of the computing system 400.

Once the historical data 428 is retrieved, the alert app 412 calculates overall computational resources usage based on the applications under execution and applies time series forecasting techniques to predict when the computing device 400 is heavily loaded.

In an implementation, the analyzing module 420 of the alert app 412 analyzes a usage pattern of the computational resources based on the applications executing on the computing device 400, by comparing and contrasting results of few time series analysis algorithms on application usage history, i.e., the history data 428, from the computing device 400. Based on the analysis and the historical data 428, the analysis module 420 estimates a prospective utilization of the computational resources by the applications executing on the computing device 400. Further, in accordance with the present subject matter, the analyzing module 420 creates a memory profile for each application running on the computing device 400, more specifically, the amount of memory freed when an application is removed or killed.

In another implementation, the analyzing module 420 may be implemented on cloud to build prediction models and analyze the usage pattern of the computational resources. Further, since the time series forecasting methods that are to be used for prediction of computation resources utilization are too heavy for a constrained environment, such as a computing device implemented as smartphone, web service encapsulating pre-processing and prediction subsystems is created and hosted on an external server, such as Glassfish server, to estimation of the prospective utilization of the computational resources.

The estimation of the prospective utilization of the computational resources is then communicated by the analysis module 420 to the notifier module 422. The notifier module 422 then determines whether the prospective utilization would result in starvation of the computational resources required for executing the data analytics app 306 on the computing device 400. In other words, the notifier module 422 determines system load in advance to predict scenarios where the user preferred app or the data analytics app 306 may get starved of computational resources, including the processing capabilities or memory, of the computing device 400. Based on the determining, the notifier module 422 provides intuitive interface to the user U, as shown in FIGS. 8A and 8B and FIGS. 9A, 9B, 9C and 9D, for alerting the user U to proactively control the execution of the applications executing on the computing device 400 for successful execution of the data analytics app 306 that is currently more important from user point of view to execute.

In an example, the user proactively control the execution of the applications executing on the computing device 400 by removing, pausing, or preempting execution of at least one of the one or more foreground applications to reclaim the computational resources for successful execution of the data analytics app 306.

In an implementation, when the user U is alerted by providing the intuitive interface and the user U opts to pause the current execution of high priority app, say, game app 102-1, the alert app 412 communicates with the scheduler module 414 to move the game app 102-1 in a ready queue 516 and to put the user preferred application, or the data analytics app 306, in highest priority position task T1 for execution on the computing device 400. Further, after the pausing of the current execution, if the system load is still high such that the user preferred application will not get the computational resources within execution deadline, the user U may remove, pause, or stop the execution of one or more other applications using the alert app 412. This is a coarse grained solution but achieves the goal with a user space application (the alert app 412).

Thus, the present subject matter described herein enables the user U to obtain alerts on the system load and to provide recommendations for proactively controlling the execution of the applications executing on the computing device 400 to reclaim the computational resources for successful execution of the user preferred application. This enables background and user processes to be spared from the standard operating system policy of process termination. However, those of ordinary skill in the art will recognize that various changes and modifications of the embodiments described herein can be made without departing from the scope of the present subject matter.

While the present subject matter has been shown and described with reference to certain exemplary embodiments thereof, it will be understood by those skilled in the art that various changes in form and details may be made therein without departing from the scope of the present subject matter as described herein.

Figure 8B:
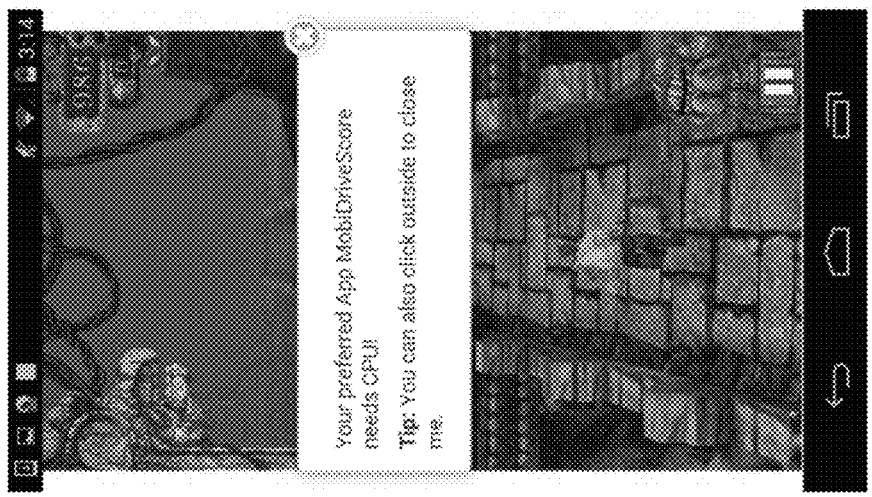
FIGS. 8A and 8B illustrate various views of an intuitive interface of the alert application, according to an exemplary implementation of the present subject matter.
Figure 8A:
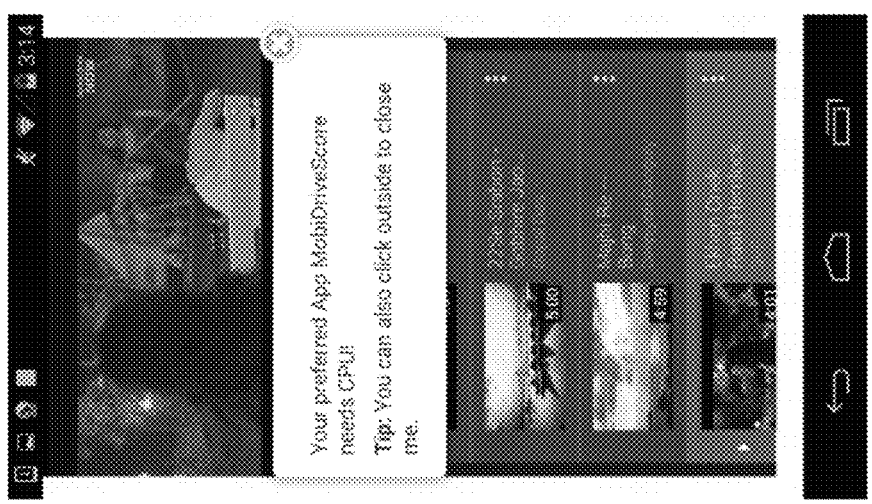
Figure 9A:
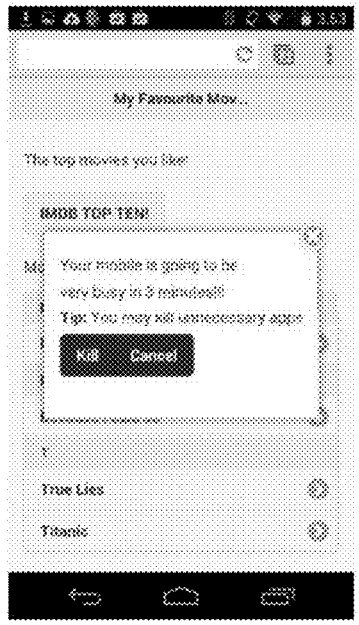
FIGS. 9A, 9B, 9C and 9D illustrate various views of an intuitive interface of the alert application, according to another exemplary implementation of the present subject matter.
Figure 9B:
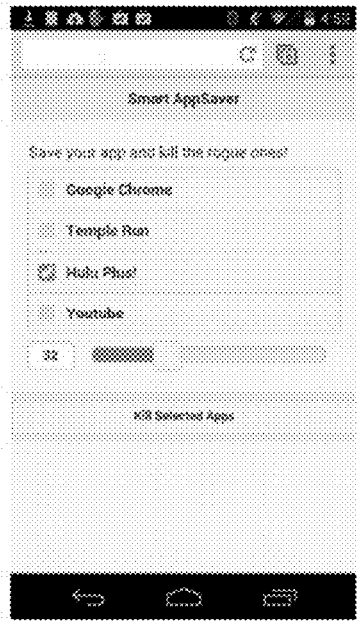
Figure 9C:
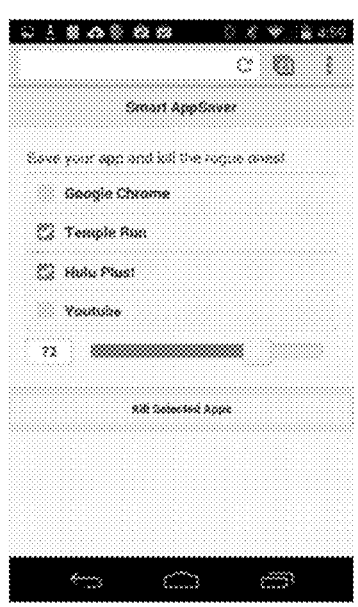
Figure 9D:
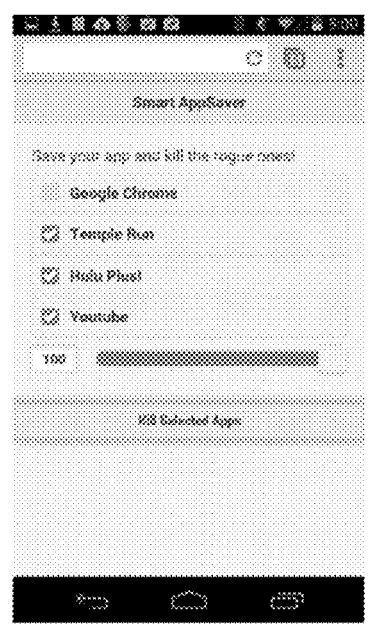

FIGS. 8A and 8B illustrate the computing device 400 in accordance with another embodiment of the present subject matter. In FIGS. 8A and 8B, modules and units that are the same as their counterparts shown in FIG. 5 are provided with the same reference numerals and are not explained in detail hereunder for the sake of simplicity. Similarly, the computing device 400 includes the scheduler module 414 in the kernel space 504. The scheduler module 414 depicted in FIG. 5 and FIGS. 8A and 8B is only for illustrating the momentary priority elevation of the user preferred application. A fully functional scheduler would take into account critical task deadlines, starvation avoidance, deadlock and live lock prevention, priority inversion avoidance etc.

In the embodiment illustrated in FIGS. 8A and 8B, the scheduler module 414 is enhanced by adding a scheduler enhancement module 424 that helps in prioritizing the user preferred application, i.e., data analytics app 306. However, those of ordinary skill in the art will recognize that for implementing the embodiment represented in FIGS. 8A and 8B, the scheduler enhancement module 424, if present, needs to be upgraded via a firmware upgrade as it changes an operating system (OS) scheduler, or the scheduler module 414, of the computing device 400. The scheduler enhancement module 424 changes the scheduler module 414 to put the user preferred application in highest priority position for execution.

In said embodiment, the alert app 412 predicts system load in advance to predict scenarios where the user preferred application may get starved of the computation resources and notifies the scheduler enhancement module 424 to pause or preempt the currently executing application. For example, in case the game app 102-1 is in highest priority queue position T1, the scheduler enhancement module 424 preempts the game app 102-1, puts the game app 102-1 in the ready queue 516, and allows the user preferred application to run automatically. In an example, the alert app 412 would notify the user U about this activity and get feedback. The user U may change the execution priorities anytime by configuring the configuration module 418 of the alert app 412.

Thus, the present subject matter described herein acknowledges the need for scheduling as per user's need, and provide mechanisms for the user to control scheduling for prioritizing the new breed of data analytics application that are being deployed in the computing devices or smartphones for user's benefit. These kinds of applications were never envisaged earlier while designing schedulers for computing devices or smartphones. The user having an option to control the schedulers using system load prediction is a non-obvious extension to the existing state of the art.

Figure 7:
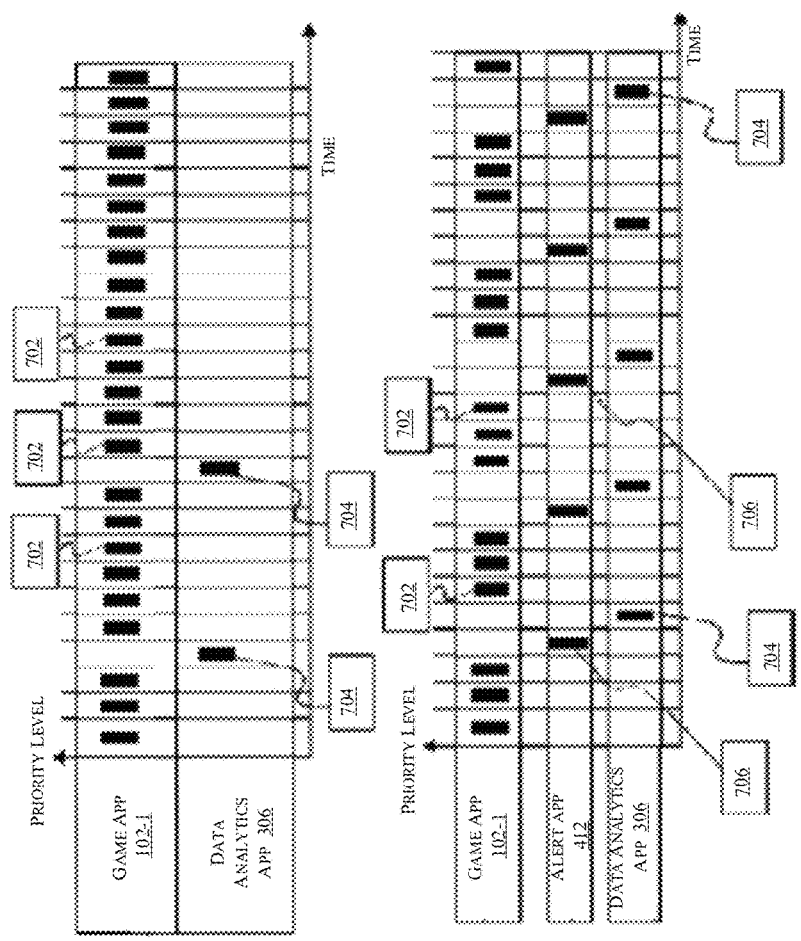
FIG. 7 illustrates a timing diagram of the implementation of the alert application, according to an embodiment of the present subject matter.

FIG. 7 illustrates a timing diagram of the implementation of the alert app 412, according to an embodiment of the present subject matter. In upper timing diagram, it can be seen that a game app 102-1, an example of interactive and high priority application, getting scheduled at almost every slot 702, whereas the periodic data analytics app 306 is not able to achieve its goal as it is scheduled for very less number of times in slots 704. On determination of such improperly scheduled execution of the apps, the alert app 412 notifies the user U. Once the alert is received by the User U at slot 706, the game app 102-1 is paused and the data analytics app 306 may get slots 704 at periodic intervals for execution along with other applications. That it, the alert app 412 provides intuitive interfaces to the user to pause/preempt or remove applications running on the computing device 400 to allow the successful execution of the data analytics app 306 that is currently more important from user point of view to run.

Thus, to maximize the benefit of running a new breed of data analytic applications in the computing devices or smartphones, the present subject matter provides a proactive control of execution priority to the users for overriding some of the system defaults.

FIGS. 8A and 8B illustrate various views of an intuitive interface of the alert application, according to an exemplary implementation of the present subject matter. In FIGS. 8A and 8B, an exemplary implementation of the present subject matter for controlling the starvation of central processing unit (CPU) or processor(s) 402 for successful execution of a preferred background analytics app is specified below:

Let $J=\{j_1, j_2, \ldots, j_n\}$ be a set of apps (operating system apps and services) that are executing on a computing device or a smartphone.

Let $JL_\tau \in J$ be a set of foreground apps (user visible apps) that use relatively high system resources during a time interval $\tau$.

Let $j_{bg}$ be the preferred background data analytics app which a user wants to execute as and when needed.

Let $C_\tau=\{c_1, c_2, \ldots, c_k\}$ be a set of contextual parameters including time of day, day of week, network cell, location, accelerometer data during the time interval $\tau$.

System resources like CPU, memory and data usage have associated levels, based on an application area where the computing device or smartphone is used. As an example, let system-wide CPU usage levels and per-app CPU usage levels are represented by the set CPU_LEVEL={low, average, high, very high}. Further, it is not out of context to note here that the system-wide CPU usage levels can be obtained by unsupervised clustering of all the sampled system-wide CPU usage levels and the per-app CPU usage levels are clustered and mapped to the set CPU_LEVEL.

For the time interval $\tau$, an output O of the data collection stage can be the following depending on the combination of apps in $JL_\tau$:

The system-wide CPU demand:

$$O_\tau^{syscpu} = \begin{cases} low, \\ average, \\ high, \\ very\ high \end{cases}$$

The per-app CPU usage of members of $JL_\tau$ and $j_{bg}$ref.

$$O_\tau^{appcpu} = \begin{cases} low, \\ average, \\ high, \\ very\ high \end{cases}$$

In an example, a set of instances of $JL_\tau$, $\hat{J} = \{JL_{\tau1}, JL_{\tau n}, \ldots JL_{\tau p}\}$ may be used as features to classify the output $O_\tau^{cpu}$. Further, $\hat{J}$ in conjunction with the context parameters $C_\tau$ may be used as historical data for prediction of the computational resources for an arbitrary interval $\tau_n$.

Further, when the predicted output from such a system, $O_\tau^{cpu}$, is high or very high and for the same arbitrary interval $\tau_n$, CPU demand of $j_{bg}$ is also high, an alert app configured in accordance with the present subject matter raise an alert for the user. That is, when there is a conditional mapping between a prospective utilization of the computational resources by the foreground and visible apps and the starvation of the computational resources for execution of the preferred background data analytics app $j_{bg}$, the alert is raised by the alert app. The alert then provides intuitive interfaces to the user to pause/preempt or remove apps executing on the computing device to allow the successful execution of the data analytics app that is currently more important from user point of view to run.

FIGS. 9A, 9B, 9C and 9D illustrate various views of an intuitive interface of the alert application, according to another exemplary implementation of the present subject matter. In FIGS. 9A, 9B, 9C and 9D, an exemplary implementation of the present subject matter for controlling the starvation of memory 406 for successful execution of a preferred background analytics job is described below:

Let $J=\{j_1, j_2, \ldots, j_n\}$ be the set of apps, $JL_\tau \in J$ be the set of apps that use relatively high memory during a time interval $\tau$, $j_{bg}$ be the user preferred background data analytics app, and $C_\tau = \{c_1, c_2, \ldots, c_k\}$ be a set contextual parameters including time, day, location, network cell, etc., during interval $\tau$;

For the time interval $\tau$, an output of the data collection will be the following:

$O_\tau^{mem} = \{low, average, high\}$ depending on the combination of apps in $JL_\tau$, where the levels are obtained by running unsupervised clustering on app memory usage. Instances of $JL_\tau \hat{J} = \{JL_{\tau r}, JL_{\tau n}, \ldots JL_{\tau p}\}$ may be used as features to classify the output $O_\tau^{mem}$. Further, $\hat{J}$ in conjunction with the context parameters G may be used as historical data for prediction of memory usage for an arbitrary time interval $\tau_n$. If the predicted output from such a system, $O_\tau^{mem}$, is high and for the same arbitrary time interval $\tau_n$, memory demand of $j_{bg}$ is also high, an alert app configured in accordance with the present subject matter raise an alert for the user.

Therefore, when there is a conditional mapping between a prospective utilization of the computational resources by the foreground and visible apps and the starvation of the computational resources for execution of the preferred background data analytics app $j_{bg}$, the alert is raised by the alert app. The alert then provides intuitive interfaces to the user to pause/preempt or remove apps executing on the computing device to allow the successful execution of the data analytics app that is currently more important from user point of view to run.

Figure 10:
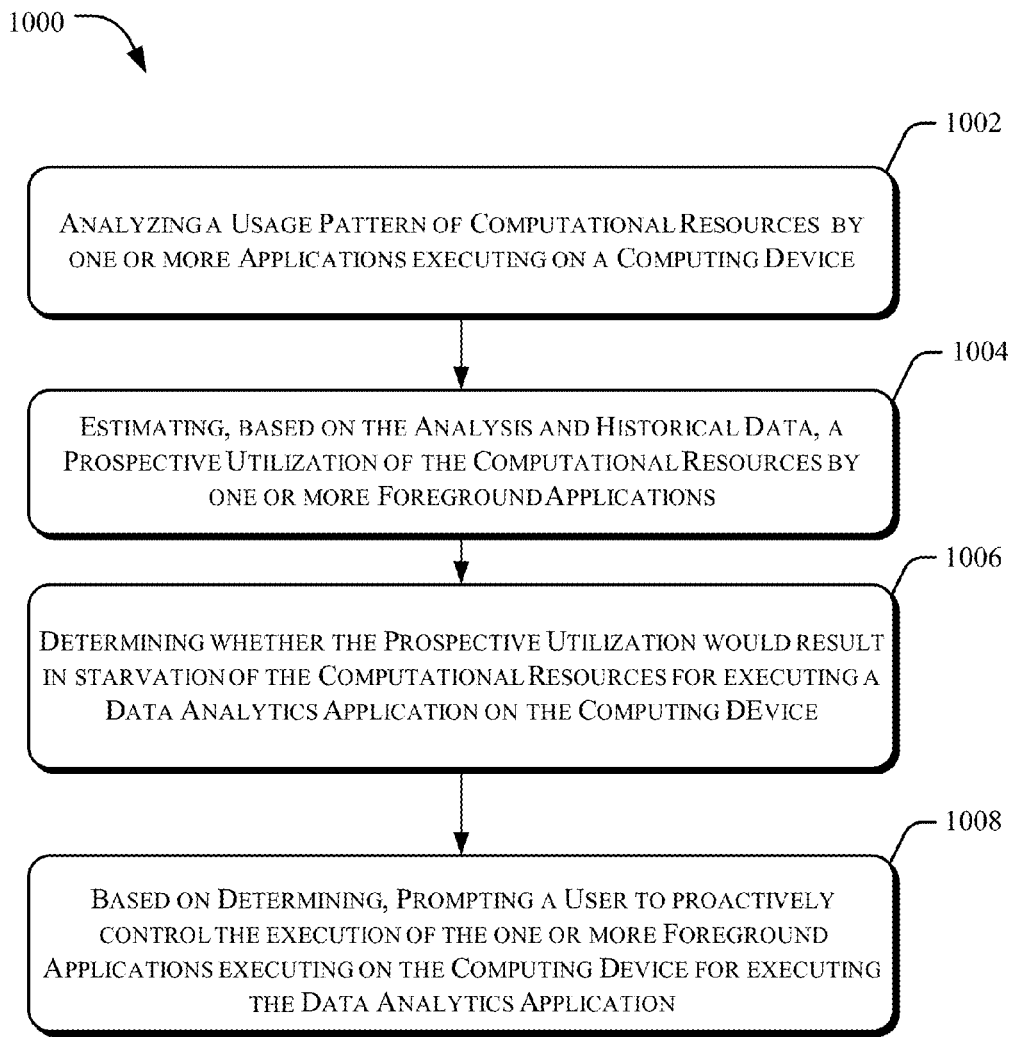
FIG. 10 illustrates an exemplary method for controlling the execution of a data analytics application on the computing device, in accordance with an embodiment of the present subject matter.

The operation of the computing device 400 is further explained in conjunction with FIG. 10. FIG. 10 illustrates an exemplary method for controlling the execution of a data analytics application 306 on the computing device 400, in accordance with an embodiment of the present subject matter. The order in which the methods 1000 is described is not intended to be construed as a limitation, and any number of the described method blocks can be combined in any order to implement the methods, or alternative methods. Additionally, individual blocks may be deleted from the methods without departing from the spirit and scope of the subject matter described herein.

The methods may be described in the general context of computer executable instructions. Generally, computer executable instructions can include routines, programs, objects, components, data structures, procedures, modules, functions, etc., that perform particular functions or implement particular abstract data types.

A person skilled in the art will readily recognize that steps of the method 1000 can be performed by programmed computers and computing devices. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and computing devices configured to perform said steps of the exemplary method.

At block 1002, an analyzing module 420 of the computing device 400 analyzes a usage pattern of the computational resources by one or more applications 102, 104. 106 executing on the computing device 400.

At block 1004, after the analyzing, the analyzing module 420 estimates a prospective utilization of the computational resources by one or more foreground applications 102, 104 based on historical 428 data and the analysis. In an example, the historical data 428 is data indicating a user-specific usage pattern of the computational resources of the computing device 400 with respect to time of day, day of week, month, year etc., and other context parameters like user's location, network cell, mobility and network usage. In said example and not by way of limitation, it is assumed that the computing device 400 is used by one particular user and a specific usage pattern exists that reveals a relative system load in terms of the computational resources usage in the computing device 400.

At block 1006, a notifier module 422 of the computing device 400 determines whether the prospective utilization would result in starvation of the computational resources required for executing a data analytics application 306 on the computing device 400.

At block 1008, based on the determining, the notifier module 422 of the computing device 400 prompts a user to proactively control the execution of the one or more foreground applications 102, 104 for successful execution of the data analytics application 306. In an example, the user proactively control the execution of the one or more foreground applications 102, 104 by removing, pausing, or preempting execution of at least one of the one or more foreground applications 102, 104 to reclaim the computational resources for successful execution of the data analytics application 306.

In this way, the present subject matter facilitates the methods and the systems with a mechanism that allows the user to work around prioritization of the high priority foreground applications with more flexibility than conventional mechanisms. Further, the mechanism proposed by the methods and systems of the present subject matter serves as a wrapper on currently available operating systems, such as Android and iphone operating system (iOS), to implement a different optimization policy that favors the interactive foreground applications, but can accommodate the requisite of the user preferred background application when specified by the user.

The methods and the systems of the present subject matter are also applicable when the user has one preferred application among several running foreground applications and needs to ensure that the preferred one gets access to computational resources when needed. Further, the methods and the systems of the present subject matter can be implemented on existing computing devices or smartphones, positioned as edge computing devices, where users already enjoy standard user experience.

Although embodiments for methods and systems for the present subject matter have been described in a language specific to structural features and/or methods, it is to be understood that the present subject matter is not necessarily limited to the specific features or methods described. Rather, the specific features and methods are disclosed as exemplary embodiments for the present subject matter.

We claim:

1. A method comprising:
analyzing a usage pattern of computational resources by applications executing on a portable computing device;
estimating, based on the analysis and historical data, a prospective utilization of the computational resources by foreground applications as a part of user space, wherein the user space is a restricted user space in which the foreground applications run and do not have direct access to hardware units of the portable computing device;
determining whether the prospective utilization would result in starvation of the computational resources for executing a sensor based data analytics application installed on the portable computing device, wherein there is no access to a user for modifying operating system firmware of the portable computing device, wherein the sensor based data analytics application is executed at a periodic time intervals in the user space, and wherein the sensor based data analytics application is designated as a user preferred background application; and
based on the determining, proactively controlling the execution of one or more foreground applications getting executed on the portable computing device in the user space to reclaim the computational resources for making the computational resources available for execution of the sensor based data analytics application in the user space and to ensure that there is no starvation of the computational resources for the sensor based data analytics application, wherein the proactively control of execution comprises one of a remove, a pause, and preempt execution of at least one of the one or more foreground applications getting executed in the user space to enable the data analytics application gets executed in the user space, wherein the proactive controlling is performed when a conditional map is present between the prospective utilization of the computational resources by the one or more foreground applications and the starvation of the computational resources for execution of the data analytics application, wherein controlling the execution of the one or more foreground applications is in response to a user input to prioritize the execution of the sensor based data analytics application in the user space without accessing the operating system firmware of the portable computing device.

2. The method as claimed in claim 1, wherein the method further comprising retrieving the historical data of a user-specific usage pattern of the computational resources based on a plurality of context parameters, and wherein the plurality of context parameters comprises a time of day, a day of week, a month, a year, a user's locations, a user's network cell, a user's mobility and a user's network usage.

3. The method as claimed in claim 2, wherein the retrieving is performed at regular intervals.

4. The method as claimed in claim 1, wherein the method comprising based on the determining, notifying the user about automatic preemption.

5. The method as claimed in claim 1, wherein the applications comprise the foreground applications and background applications.

6. A portable computing device comprising:
a processor;
an analyzing module, coupled to the processor, to:
analyze a usage pattern of computational resources by applications executing on the portable computing device;
estimate, based on the analysis and historical data, a prospective utilization of the computational resources by foreground applications as a part of user space, wherein the user space is a restricted user space in which the foreground applications run and do not have direct access to hardware units of the portable computing device; and
a notifier module, coupled to the processor, to:
determine whether the prospective utilization would result in starvation of the computational resources for executing a sensor based data analytics application installed on the portable computing device, wherein the sensor based data analytics application is executed at a periodic time intervals, and wherein there is no access to a user for modifying operating system firmware of the portable computing device, and wherein the sensor based data analytics application is designated as a user preferred background application executing in the user space at periodic time intervals; and based on the determining, proactively controlling the execution of one or more foreground applications getting executed on the portable computing device in the user space to reclaim the computational resources for making the computational resources available for executing the sensor based data analytics application in the user space and to ensure that there is no starvation of the computational resources for the sensor based data analytics application, wherein the proactively control of execution comprises one of a remove, a pause, and preempt execution of at least one of the one or more foreground applications getting executed in the user space of the portable computing device to enable the data analytics application gets executed in the user space, wherein the proactive controlling is performed when a conditional map is present between the prospective utilization of the computational resources by the one or more foreground applications and the starvation of the computational resources for execution of the data analytics application, wherein controlling the execution of the one or more foreground applications is in response to a user input to prioritize the execution of the sensor based data analytics application in the user space without accessing the operating system firmware of the portable computing device.

7. The computing device as claimed in claim 6, wherein the notifier module notifies the user about automatic preemption based on the determining.

8. The computing device as claimed in claim 6, wherein the computing device further comprising a scheduler enhancement module to prioritize the user preferred background application in an operating system scheduler of the computing device, and wherein the prioritizing of the user preferred background application is achieved without changing operating system firmware.

9. The computing device as claimed in claim 6, wherein the computing device further comprising a usage monitoring module to retrieve the historical data of a user-specific usage pattern of the computational resources, at regular time intervals, based on a plurality of context parameters, and wherein the plurality of context parameters comprises a time of day, a day of week, a month, a year, a user's locations, a user's network cell, a user's mobility and a user's network usage.

10. The computing device as claimed in claim 6, wherein the applications comprise the foreground applications and background applications.

11. A non-transitory computer-readable medium having embodied thereon a computer program for executing a method comprising:

analyzing a usage pattern of computational resources by applications executing on a portable computing device;

estimating, based on the analysis and historical data, a prospective utilization of the computational resources by foreground applications as a part of user space, wherein the user space is a restricted user space in which the foreground applications run and do not have direct access to hardware units of the portable computing device;

determining whether the prospective utilization would result in starvation of the computational resources for executing a sensor based data analytics application installed on the portable computing device, wherein there is no access to a user for modifying operating system firmware of the portable computing device, wherein the sensor based data analytics application is executed at a periodic time intervals in the user space, and wherein the sensor based data analytics application is designated as a user preferred background application; and based on the determining, proactively controlling the execution of one or more foreground applications getting executed on the portable computing device in the user space to reclaim the computational resources for making the computational resources available for execution of the sensor based data analytics application in the user space and to ensure that there is no starvation of the computational resources for the sensor based data analytics application, wherein the proactively control of execution comprises one of a remove, a pause, and preempt execution of at least one of the one or more foreground applications executing on the portable computing device in the user space to enable the data analytics application gets executed in the user space, wherein the proactive controlling is performed when a conditional map is present between the prospective utilization of the computational resources by the one or more foreground applications and the starvation of the computational resources for execution of the data analytics application, wherein controlling the execution of the one or more foreground applications is in response to a user input to prioritize the execution of the sensor based data analytics application in the user space without any access to modify the operating system firmware of the portable computing device.

* * * * *